United States Patent [19]

Hostetler et al.

[11] Patent Number: 4,559,094

[45] Date of Patent: Dec. 17, 1985

[54] PROCESS FOR FORMING CUSHION ARTICLES

[75] Inventors: John E. Hostetler, Bettendorf; William H. Hulsebusch, Dewitt; I. Weir Sears, Davenport, all of Iowa

[73] Assignee: Sears Manufacturing Company, Davenport, Iowa

[21] Appl. No.: 655,917

[22] Filed: Oct. 2, 1984

Related U.S. Application Data

[63] Continuation-in-part of Ser. No. 572,068, Jan. 19, 1984, abandoned.

[51] Int. Cl.⁴ ...................... B29D 27/04; D06M 1/00
[52] U.S. Cl. .................................. 156/212; 264/46.6; 264/46.8; 264/129
[58] Field of Search .................... 264/46.8, 46.6, 129; 8/115.6; 156/212

[56] References Cited

U.S. PATENT DOCUMENTS

| | | | |
|---|---|---|---|
| 3,943,215 | 3/1976 | Grune et al. | 264/46.8 X |
| 4,114,213 | 9/1978 | Beernaerts et al. | 264/46.8 X |
| 4,247,347 | 1/1981 | Lischer et al. | 264/46.6 X |
| 4,247,348 | 1/1981 | Lischer | 156/79 |
| 4,264,386 | 4/1981 | Sears, Jr. et al. | 264/46.8 X |
| 4,287,143 | 9/1981 | Sears, Jr. et al. | 264/46.8 |
| 4,293,305 | 10/1981 | Wilson | 8/115.6 |

Primary Examiner—Philip Anderson
Attorney, Agent, or Firm—Niro, Scavone, Haller & Niro

[57] ABSTRACT

A process for forming cloth-covered cushion articles. A mold is provided having the shape of the desired cushion article. In one form, a cloth covering is drawn into the mold. Foamable material is poured into the mold and cured to form the cushion article. The covered, cured article is removed from the mold and heated to at least the heat-fixable fiber set temperature of the cloth, as the cured foam acts as a male mold to hold the cloth in contour during heat setting. In another form, the foam is poured directly into the mold and cured. The cloth covering then is placed over the cured cushion and set.

38 Claims, 9 Drawing Figures

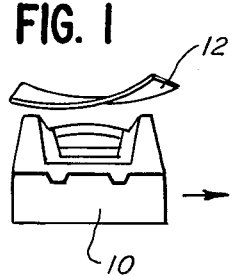
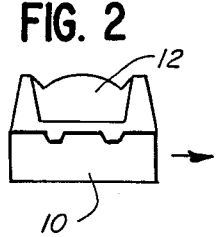
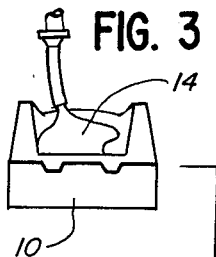
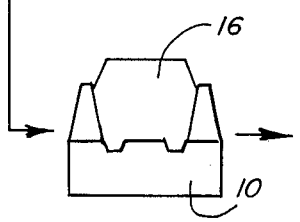
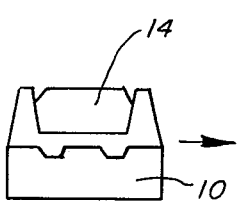
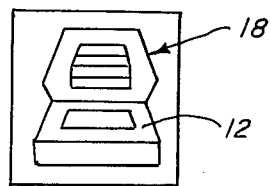
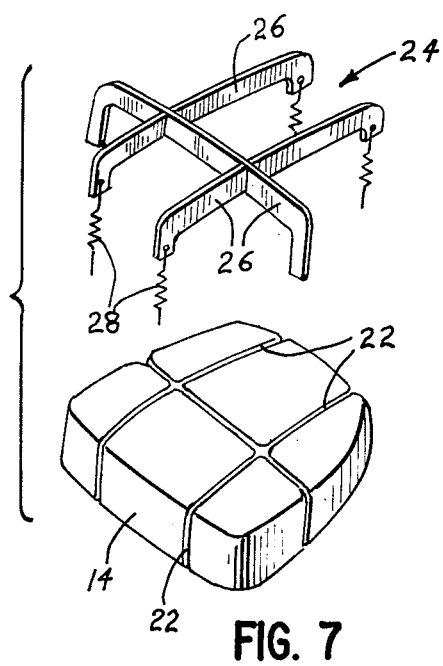
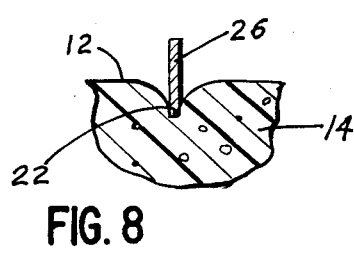
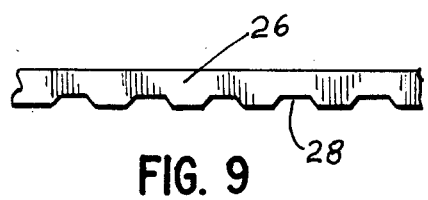

PROCESS FOR FORMING CUSHION ARTICLES

REFERENCE TO RELATED APPLICATION

This is a continuation-in-part of Application Ser. No. 572,068, filed Jan. 19, 1984 and now abandoned.

BACKGROUND OF THE INVENTION

This invention relates generally to a cushion article and a process for molding the article and, more particularly, to an upholstered cushion which has a cloth covering including an outer fabric layer of standing pile fabric or the like, the fabric being heat set without disturbing the natural surface characteristics of the fabric.

Traditional methods of making upholstered cushions have involved cutting the cover material according to an appropriate pattern, sewing the material and stuffing the cushion. Such methods result in high labor costs since, in most instances, the cutting and sewing operations are performed manually or with labor intensive techniques.

To reduce the costs of manufacturing cushion articles, a molding process was devised for manufacturing seat cushions comprising a foam portion having an integral vinyl cover. The vinyl cover first is heated and then drawn into a cold mold by means of a vacuum between the vinyl and the mold. As the vinyl cools, it assumes the contours of the molds. Foam then is poured into the mold to form the foam portion of the seat cushion. This process significantly reduces manufacturing costs.

However, cloth has many advantages over vinyl. Specifically, cloth is water vapor permeable. Perspiration that normally collects behind a person sitting in a vinyl seat can pass through cloth and be evaporated so that cloth feels cooler during warm weather and warmer during cold weather. Furthermore, the feel of the cloth is much more luxurious and elegant.

In recognition of these advantages, a novel molding process was devised for manufacturing seat cushions comprising a foam portion having an integral cover including an outer cloth layer. Such a process is disclosed in U.S. Pat. Nos. 4,247,347; 4,247,348 and 4,264,386. In that process it was found particularly advantageous to set the stitch of the fabric layer in the mold. This is accomplished by employing a mold heated to at least the fabric set temperature when the cloth is drawn into the mold. The fabric layer is thereby heated and then allowed to cool. By this process the fabric stitch is set to the precise contours of the mold. A foamable material then is poured into the mold after the cooling step to form an integral seat cushion with a fabric cover. The fabric normally is bonded or laminated to a vinyl film to permit the cover to be vacuum drawn into the mold.

All of the above innovations in the art have resulted in labor savings and improved products because the cloth is processed and shaped much more quickly than in the traditional cutting and sewing process. Shapes commonly found in tufted furniture require yards of sewing, and the assembly of tufts also requires extensive labor.

Yet, certain problems still have not been met by the above innovations in the art. First, tremendous time and energy losses are incurred by repeatedly heating the mold to set the fabric layer of the cover and then cooling the mold to pour the foamable resin and form the integral cushion. A method of reducing some energy losses is disclosed in U.S. Pat. No. 4,287,143. In that method, the cloth is heated to its set temperature in a first mold and then transferred to a cooler mold where the foam cushion is formed. This process, however, obviously requires multiple molds.

A second problem associated with these prior art processes concerns the use of standing pile or "plush" fabrics which have definite natural surface characteristics. For purposes herein, such fabrics are intended to include velour, velvet, brushed and a variety of fabric materials which have a defined pile that is capable of being crushed or the surface characteristics destroyed by heat and pressure. When such pile fabrics are drawn into a mold and heated to their heat-fixable fiber set temperatures, not only are the fibers set but the pile becomes set as well as it is biased against the interior surface of the mold. Thus the surface characteristics of the pile become altered or destroyed.

The present invention is directed to solving the above-identified problems by providing a new and improved process of molding a cushion article without repeated heating and cooling of molds and without altering the surface characteristics of the covering fabric of the cushion.

SUMMARY OF THE INVENTION

An object, therefore, of the present invention is to provide a new and improved process for forming cloth-covered cushion articles such as seat cushions or the like.

Another object of the present invention is to provide a process which eliminates or significantly reduces the energy losses incurred by repeated heating and cooling of molds to first set the cloth covering and then to pour the resin and cure the foam for the cushion.

A further object of the present invention is to provide a process wherein the desirable surface characteristics of the cloth covering remain unaltered.

Still another object of the present invention is to provide a process wherein the cloth covering is applied to the foam cushion after it is formed and heat set with the cushion acting as a male mold.

The invention, briefly, contemplates heat setting of the cloth covering of a cushion article in contour after the cushion is formed.

More particularly, a process according to the invention for forming clothcovered cushion articles contemplates providing a mold having the shape of the desired cushion article. In one form of the invention, a cloth covering is drawn into the mold. Polyurethane resin then is poured into the mold and cured to form the foam cushion article. The cushion article is removed from the mold and heated to at least the heat-fixable fiber set temperature of the cloth covering. Thus, the cloth covering is heat set in contour after the cushion is formed. The cured foam cushion itself acts as a male mold to hold the fabric of the cloth in contour as it is heat set. It can be seen that the novel use of the cushion as a male mold eliminates any interference with or possible altering of the natural surface characteristics of the outer fabric layer of the cloth covering during the heat setting operation.

It has proven effective to heat the mold to a temperature on the order of approximately 130° F. to 150° F. to facilitate the foaming process. However, this temperature is considerably less than the heat-fixable fiber set temperature of the covering fabric. After the foam cures in the mold, the covered cushion article is placed in an oven at a temperature on the order of approximately 360° F. to heat set the fabric. Significant energy savings are therefore realized by eliminating the repeated heating and cooling of the mold as is prevalent in prior processes where the foam is cured and the fabric is set in a single mold.

When using polyester fabric for the cushion cover, the formed cushion article simply can be placed into a dry oven to heat set the fabric in contour on the formed cushion.

However, when using nylon fabric as the outer layer of the cloth covering, it has been found that the application of a high-boiling point solution facilitates setting the nylon fabric. For instance, a diester solution such as disclosed in U.S. Pat. No. 4,293,305 may be applied to the unfinished nylon fabric prior to heat setting.

In another form of the invention, the resin is poured directly into the mold and cured to form the desired shape of the cushion article. The cured foam is removed from the mold and an unfinished cloth covering is placed over it. The covering preferably is preformed into a complementary three-dimensional shape and is held onto the foam cushion article by any one of a variety of means such as mechanical clamps or adhesive. The cloth covering then is heated while on the cured foam so that the cloth will retain the three-dimensional shape of the cured foam cushion. The cloth covering then is cooled while on the cushion. Here again, the cured foam cushion itself acts as a male mold to hold the fabric of the cloth in contour as it is heat set.

Other features, advantages and objects of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which:

FIG. 1 is an illustration of the cloth insertion step of the process;

FIG. 2 is an illustration of the cloth drawing step of the process;

FIG. 3 is an illustration of the foam pouring step of the process;

FIG. 4 is an illustration of the curing step of the process;

FIG. 5 is an illustration of the cushion extraction step of the process;

FIG. 6 is an illustration of the cloth setting step of the process;

FIG. 7 is a perspective view of a contoured cushion and fixture means for holding the cloth covering on the cushion during setting;

FIG. 8 is a fragmented section illustrating a portion of the fixture means holding the cloth covering in a depression in the cushion; and FIG. 9 is a fragmented elevation of a portion of the fixture means, illustrating its bottom serrated edge.

DETAILED DESCRIPTION OF THE PREFERRED EMBODIMENT

The process of the present invention may be employed to form or mold cloth-covered cushion articles for any conceivable application. Such applications include automotive vehicle seats, aviation seats, chair cushions, stool cushions and other seating application; padding for headboards, baby carriages, bar fronts, church kneelers, buses and handrails; as well as panelling and wall coverings for elevators, offices, tables, cabinets and the like.

The process of the present invention may utilize a wide variety of cloth materials, such as the woven or knitted from man-made or natural yarns or fibers which are capable of being heat set. To this end, the invention contemplates the use of "unfinished cloth" which is intended to mean cloth that has not been subjected in the flat to any of the conventional treatments intended to impart to the cloth a permanent dimensional or shape memory or to set or fix the intersections of the yarn.

The use of "standing pile fabrics" is intended to mean fabrics which have a definite natural surface characteristic or "surface loft", such as velour, velvet, brushed and a variety of fabric materials which have a defined pile that is capable of being crushed or the surface characteristics destroyed or altered by heat and pressure.

In its simplest form, the invention contemplates heat setting at least the outer fabric layer of a cloth-covered cushion article in contour after the cushion itself is formed. This not only eliminates repeated heating and cooling of the molds in various known processes, but the surface characteristics of the cloth fabric remain unaltered and in natural condition.

More particularly, with reference to the drawings, the process of the present invention includes the provision of a mold such as female mold 10 (FIG. 1) having the shape of a desired cushion article, such as a seat cushion or the like. A cloth covering 12 is provided for the cushion article. Types of cloth coverings are illustrated in the U.S. patents described above and normally include an outer fabric layer bonded to an elastic composition layer. The fabric layer will engage the interior surface of female mold 10. The composition layer normally includes a film layer and a foam layer sandwiched between the film layer and the fabric layer. The film layer permits the cloth covering to be vacuum drawn into female mold 10 as shown in FIG. 2.

After cloth covering 12 is drawn into mold 10, foamable material (i.e. polyurethane resin) 14 may then be poured into the mold in its liquid state, as illustrated in FIG. 3. In the preferred embodiment, cold cure, polyether-type polyurethane is employed, although any foamable material that adheres to the film layer of the cloth covering may be used. In practice, female mold 10 may be heated at a temperature on the order of approximately 130° F. to render cloth covering 12 pliable.

A male mold 16 then is placed over female mold 10 as illustrated in FIG. 4. After approximately 15 minutes, foam 14 has fully expanded within the mold. The unfinished cushion article may then be extracted from female mold 10 as illustrated in FIG. 5.

The unfinished cushion article, generally designated 18 (FIG. 6), then is placed in an oven 20 where it is heated to at least the heat-fixable fiber set temperature of the cloth covering 12. Thus, it can be seen that the cloth covering is heat set in contour after the foam cushion itself is formed. The foam cushion acts as a male mold to hold the fabric of the covering in contour during heat setting in oven 20.

It can be seen from the foregoing that repeated heating and cooling steps of prior art processes are completely eliminated by the process of the present invention. Furthermore, it can be seen that the outer surface of the outer fabric layer of the cloth covering 12 never comes in contact with the surface of a mold which is heated sufficiently to set the fabric or alter the pile or natural surface characteristics of the fabric. The following specific examples will serve to illustrate the cloth molding process of this invention.

EXAMPLE 1

A moldable cloth covering including a fabric layer of 14-ounce unfinished polyester pile material was drawn into mold 10. Foamable material was poured into the mold in its liquid state and cold cured. The unfinished cushion article was placed in oven 20 and heated to a temperature on the order of approximately 360° F. The pile fabric was heat set as the cured foam cushion acted as a male mold to hold the cloth covering in contour during heat setting of the fabric. The pile of the fabric was unaltered and its natural surface characteristics retained.

EXAMPLE 2

A moldable cloth including an outer layer of unfinished nylon was drawn into mold 10. The nylon fabric was a Type 6, 12-13 ounce knit material. Foamable material 14 was poured into the mold in its liquid state and cold cured. The unfinished cushion article was sprayed with a cold diester solution and placed in oven 20. The oven was heated at a temperature on the order of approximately 300° F. The nylon fabric of the covering for the cushion heat set in contour as the cured foam acted as a male mold to hold the fabric during heat setting. The cushion article was rinsed with a solvent to remove excess diester solution, and the article was dried to evaporate the solvent. The natural surface characteristics of the nylon fabric remained totally unaltered and in natural condition.

EXAMPLE 3

A moldable nylon cloth was used in a process similar to that described above in Example 2. However, instead of applying cold diester solution to the fabric and heating the fabric covered cushion in an oven, the diester solution itself was applied hot at a temperature on the order of approximately 300° F. The nylon fabric of the covering for the cushion heat set in contour onto the foam cushion as the cushion acted as a male mold to hold the fabric in contour during the heat setting. The natural surface characteristics of the fabric remained unaltered and in natural condition.

In another form of the invention, polyurethane resin 14 is poured directly into mold 10 and cured to form the desired shape of the foam cushion article. The foamable material may be poured into the mold in its liquid state and cold cured. The cured foam cushion is removed from the mold and a cloth covering is placed over the cushion. The covering is of unfinished cloth. The cloth preferably is preformed into a shell complementary to the three-dimensional shape of the cushion article. The shell is held onto the cushion by any of a variety of means such as mechanical means or adhesive. An open cell foam can be employed and vacuum applied to a vinyl backed covering. The cloth covering then is treated or and/or heated while on the cured foam cushion so that the cloth will retain the three-dimensional shape of the cushion. The cloth covering then is cooled while on the cushion. Here again, the cured foam cushion itself acts as a male mold to hold the fabric of the cloth in contour as it is heat set.

The cloth covering is heated to a temperature above the heat-set threshold and cooled to a temperature below the cloth heat-set temperature. However, the present invention is not intended to be limited to any particular heat or chemical setting processes. Rather, the present invention is directed to any finishing step which will effect shape and dimensional memory in the cloth while it is on the cured foam cushion.

As described in relation to the latter form of the invention, and referring to FIGS. 7-9, when the foam cushion first is formed and the cloth covering is thereafter placed over the cushion for setting, the three-dimensional shell is held onto the cushion by a variety of means such as mechanical means or adhesive. FIGS. 7-9 show one form of mechanical means that not only holds the unfinished shell onto the preformed cushion, but also holds the cloth covering in various contours which may have been formed in the cushion.

More particularly, a preformed cushion may have various contour lines or other contour features forming depressions. There may be a tendency for the cloth covering, during setting, to shrink or lose contour and sometimes pull away from the preformed cushion. Therefore, appropriate complementary fixture means are employed to hold the cloth covering in the contour depressions during setting. For instance, the cushion may have style lines or grooves 22 (FIG. 7) in its surface. Complementary fixture or frame means, generally designated 24, are provided to hold the cloth covering in the style lines or grooves. As shown, fixture means 24 comprises a plurality of thin edge-projections 26 integrally formed and held down onto the cushion by springs 28 secured to an appropriate base.

FIG. 8 illustrates one of the edge-projections 26 holding cloth covering 12 in a style line or groove 22 of foam cushion 14.

FIG. 9 shows one of the edge-projections 26 of fixture means 24 provided with a serrated bottom edge 28. During setting, this serrated bottom edge will emboss the cloth covering to simulate various designs such as stitching.

In summary, the cloth covering may be treated while on the foam cushion in a variety of ways to complete the finishing of the cloth in the desired predetermined shape. The particular treatment employed will, of course, depend on the kind of cloth used in the process. For example, synthetics such as polyester, nylon and acrylic may be effectively set by use of a tentering treatment; cotton cloth may be set by tentering and/or ammonia swelling processes; and wool by tentering or crabbing, dry finishing and decating. Those skilled in the art will appreciate, however, that many other setting treatments may be employed. It can be seen that the foam cushion article which acts as a novel male mold in treating or setting the cloth covering actually becomes part of the final product. Of course, the cured foam cushion must be sufficiently rigid to withstand any shrinkage of the cloth during setting. It has been found that at least a 35 pound deflection rating is acceptable. In other words, an "indention load deflection" rating is determined by the weight required to deflect the foam one inch when applied over a fifty inch area.

Although only a few exemplary embodiments of this invention have been described in detail above, those skilled in the art will readily appreciate that many modifications, including different heat setting techniques, are possible in the exemplary embodiments without materially departing from the novel teachings and advantages of this invention.

Accordingly, all such modifications are intended to be included within the scope of this invention as defined in the following claims.

What is claimed is:

1. A process for forming cloth-covered cushion articles, comprising the steps of:
   providing a mold having the shape of the desired cushion article;
   drawing a cloth covering into said mold, said cloth covering having heat fixable fibers therein;
   pouring a foamable material into said mold, foaming said foamable material and curing the foam at a temperature below the heat-fixable fiber set temperature of the cloth covering to form the cushion article;
   removing the cushion article from said mold; and
   heating the cushion article to at least the heat-fixable fiber set temperature of the cloth covering.

2. The process of claim 1 wherein said heating step includes placing the cushion article in an oven at a temperature on the order of approximately 360° F.

3. The process of claim 2 wherein said cloth covering is provided of polyester material.

4. The process of claim 1 wherein said mold is heated at a temperature of not more than 200° F.

5. The process of claim 1 wherein a diester solution is applied to the cloth covering after the cushion article is removed from the mold and before the cushion article is heated to set the cloth covering.

6. The process of claim 5, including the steps of rinsing the cushion article with a solvent to remove excess diester solution after heating, and drying the cushion article to evaporate the solvent.

7. The process of claim 5 wherein the cloth covering is provided of nylon material.

8. The process of claim 1 wherein said heating step includes placing the cushion article in an oven with said cured foam acting as a male mold for the cloth covering.

9. A process of forming cloth-covered cushion articles, comprising the steps of:
   providing a mold having the shape of the desired cushion article;
   drawing a cloth covering into said mold, the cloth covering including at least a layer of nylon fabric;
   pouring a foamable material into said mold, foaming said foamable material and curing the foam at a temperature below the heat-fixable fiber set temperature of said nylon fabric to form the cushion article;
   removing the cushion article from said mold;
   applying a diester solution to the cloth covering; and
   heating the cushion article to at least the heat-fixable fiber set temperature of said nylon fabric.

10. The process of claim 9 wherein said heating step includes placing the cushion article in an oven at a temperature on the order of approximately 300° F.

11. The process of claim 9 wherein said mold is heated at a temperature of not more than 200° F.

12. The process of claim 9 wherein said heating step is performed by applying said diester solution in sufficiently heated condition.

13. The process of claim 9, including the step of rinsing the cushion article with a solvent to remove excess diester solution after heating.

14. The process of claim 13, including the step of drying the cushion article to evaporate the solvent.

15. A process for molding a cloth-covered seat cushion, comprising the steps of:
   providing a mold having the shape of a desired seat cushion;
   drawing a cloth covering into said mold, the cloth covering including at least an outer layer of standing pile fabric or the like, said cloth covering having heat fixable fibers therein;
   pouring cold foamable material into said mold, foaming said foamable material and curing the foam at a temperature below the heat fixable fiber set temperature of the cloth material to form the seat cushion;
   removing the seat cushion from said mold; and
   heating the seat cushion to a temperature sufficient to set the fibers of the fabric but not to alter the natural surface characteristics thereof.

16. The process of claim 15 wherein said heating step includes placing the seat cushion in an oven with said cured foam acting as a male mold for the cloth covering.

17. The process of claim 15 wherein said mold is heated at a temperature of not more than 200° F.

18. The process of claim 15 wherein a diester solution is applied to the cloth covering after the seat cushion is removed from the mold and before the seat cushion is heated to set the cloth covering.

19. The process of claim 18, including the steps of rinsing the seat cushion with a solvent to remove excess diester solution after heating, and drying the seat cushion to evaporate the solvent.

20. The process of claim 18 wherein said diester solution is applied in a heated condition on the order of approximately 300° F.

21. A process for forming a cloth-covered cushion article, comprising the steps of:
   constructing a foam cushion having the shape of the desired cushion article;
   placing a cloth covering over the cushion, the covering being of unfinished cloth including heat fixable fibers;
   heating the cloth covering while on the cushion to at least the heat-fixable fiber set temperature of the cloth covering so that the cloth will retain the three-dimensional shape of the cushion; and
   cooling the cloth covering while on said cushion.

22. The process of claim 21 wherein said cloth covering is heated to a temperature above the cloth heat-set threshold and cooled to a temperature below the cloth heat-set temperature.

23. The process of claim 21 wherein the cloth covering is held onto the cushion during said heating step.

24. The process of claim 21 wherein the cloth covering is preformed into a shell complementary to the three-dimensional shape of the cushion.

25. The process of claim 24 wherein the preformed shell is held onto the cushion during said heating step.

26. A process for forming a cloth-covered cushion article, comprising the steps of:
   constructing a foam cushion having the shape of the desired cushion article;
   placing a cloth covering over the cushion, the covering being of unfinished cloth; and
   treating the cloth covering while on the cushion so that the cloth will retain the three-dimensional shape of the cushion.

27. The process of claim 26 wherein the cloth covering is held onto the cushion during said treating step.

28. The process of claim 27 wherein said foam cushion is constructed with a contour including at least one depression, and the cloth covering is held onto the cushion with portions held in said depression.

29. The process of claim 28, including the step of applying fixture means to said cloth covering before said treating step to hold the covering onto the cushion.

30. The process of claim 29 wherein said fixture means has projection means for holding the cloth covering in said depression.

31. The process of claim 26 wherein the cloth covering is preformed into a shell complementary to the three-dimensional shape of the cushion.

32. The process of claim 28 wherein the preformed shell is held onto the cushion during said treating step.

33. A process for forming a cloth-covered cushion article, comprising the steps of:

constructin a foam cushion having the shape of a desired cushion article including a contour having at least one depression;

placing a cloth covering over the cushion, the cloth covering having heat fixable fibers therein;

holding the cloth covering onto the cushion with portions thereof held in said depression;

heating the cloth covering while held on the cushion to at least the heat-fixable fiber set temperature of the cloth covering; and cooling the cloth covering on said cushion.

34. The process of claim 33 wherein the cloth covering is released from the cushion after said cooling step.

35. The process of claim 34, including the step of applying fixture means to said cloth covering before said heating step to hold the covering onto the cushion.

36. The process of claim 35 wherein said fixture means has projection means for holding the cloth covering in said depression.

37. The process of claim 36 wherein said foam cushion is constructed with depressions defining style lines, and said fixture means is provided with edge-projections for holding the cloth covering in said style-line depressions.

38. The process of claim 37 wherein said edge-projections are serrated to create embossments in the cloth covering, during setting, to simulate stitching.

* * * * *